United States Patent [19]

Goodale et al.

[11] Patent Number: 4,499,148
[45] Date of Patent: Feb. 12, 1985

[54] COMPOSITE MATERIALS OF SILICONE ELASTOMERS AND POLYOLEFIN FILMS, AND METHOD OF MAKING

[75] Inventors: Robert H. Goodale, Boulder, Colo.; James M. DuJack, Brunswick, N.Y.

[73] Assignees: Canton Bio-Medical Products, Inc., Boulder, Colo.; Visilox Systems, Inc., Troy, N.Y.

[21] Appl. No.: 456,637

[22] Filed: Jan. 10, 1983

[51] Int. Cl.³ .................. B29C 19/02; B29C 19/04; B29C 19/06; B65C 9/25

[52] U.S. Cl. .................. 428/447; 428/424.8; 428/425.5; 428/354; 156/272.6; 156/273.5; 156/275.5; 156/275.7; 156/322; 156/329; 427/40; 106/287.1

[58] Field of Search .............. 156/272.6, 273.5, 275.5, 156/275.7, 90, 322, 329; 427/39-41, 400; 428/424.8, 425.5, 354, 447, 451; 106/287.1, 287.35

[56] References Cited

U.S. PATENT DOCUMENTS

| | | |
|---|---|---|
| 2,768,909 | 10/1956 | Haslam ............... 156/332 |
| 2,943,955 | 7/1960 | Brill ................... 156/319 |
| 2,976,185 | 3/1961 | McBride ............. 428/451 |
| 3,002,854 | 10/1961 | Brill .................... 156/309.3 |
| 3,080,266 | 3/1963 | Haslam ............... 156/309.3 |
| 3,632,386 | 1/1972 | Hurst .................. 428/451 |
| 3,667,993 | 6/1972 | Stevenson ........... 428/451 |
| 3,773,638 | 11/1973 | Gotoh et al. ........ 156/275.5 |
| 3,794,556 | 2/1974 | Young ................. 428/451 |
| 4,243,718 | 1/1981 | Murai et al. ........ 428/451 |
| 4,312,693 | 1/1982 | Salensky et al. .... 427/39 |
| 4,332,844 | 6/1982 | Hamada et al. ..... 156/329 |

Primary Examiner—Edward Kimlin
Assistant Examiner—Merrell C. Cashion
Attorney, Agent, or Firm—O'Rourke & Harris

[57] ABSTRACT

Composite materials formed of bonded silicone elastomers and polyolefin films, for uses including catheters, closures for piercing by medical needles, and medical containers, the bonding between the normally inert unbondable materials being accomplished by corona discharge treatment of the polyolefin film and the use of an ethyl silicate, ethyl ortho silicate and tetra butyl titanate solution primer on the treated polyolefin adjacent the uncured silicone elastomer such that the materials may be securely bonded one to the other by curing through the application of heat and pressure.

10 Claims, 5 Drawing Figures

COMPOSITE MATERIALS OF SILICONE ELASTOMERS AND POLYOLEFIN FILMS, AND METHOD OF MAKING

BACKGROUND OF THE INVENTION

As is well known, silicone rubber is useful particularly in the medical field as a result of its inert nature and compatibility with human tissue. However, for a number of reasons, silicone elastomers per se display drawbacks in various medical and other utilities. In addition to expense, in the instance of catheters, silicone rubber per se is soft limp and thus difficult to insert into human tissues. However, the inert nature of silicone elastomers with regard to tissue, drugs, etc. strongly recommends use as catheters and other such medical uses.

Silicone rubber is also employed as closures for bottles or containers adapted to receive a needle through the closure to draw, for instance, injectable materials. However, the silicone rubber tends to "core" as the needle is passed therethrough, and is not heat sealable thereby precluding bonding of the closure to the container as is desirable particularly with sterilized materials. Clearly a "core" which may be inadvertently injected is of substantial concern.

Accordingly, the instant invention addresses the inert nature of silicone elastomers and provided a heretofore unavailable method of bonding such elastomers to polyolefin materials, i.e. polyethylene and polypropylene, having cost and properties very useful in the medical field. Polypropylene is particularly advantageous in that when bonded the composite can be autoclaved.

For instance, by bonding an outer film of silicone rubber to polypropylene tubing, a catheter primarily of low cost polyolefin having desirable rigid or stiffened structure for insertion into tissue is produced in a straight forward, economical fashion. By enclosing a silicone closure body within a polyolefin film, the closure may be hermetically bonded by, for instance, induction or ultrasonic welding, of the polyolefin to the container. The outer polyolefin film surface tends to preclude "coring" of the closure as the needle is passed therethrough thereby avoiding the inadvertent deposit of closure material into the contents of the closure or in the needle. As will be described in more detail below, a polyolefin surface film strengthens the silicone material at the interface between the materials. A needle may be passed through the composite material with a substantially reduced chance of removing a "core".

DISCUSSION OF THE PRIOR ART

Though it has been known that silicone elastomer materials of low molecular weight can be utilized as adhesive material for bonding to films such as polyolefin films, it has heretofore been unknown to bond uncured silicone elastomers of high molecular weight, i.e. molecular weights above 61,000 with a minimum elongation modulus of fifty per cent, to polyolefin materials.

An example of an adhesive used in conjunction with a silicone polymer surface is to be found in Hearst U.S. Pat. No. 3,632,368 issued Jan. 4, 1972. In this patent, a typical structure involves a paper substrate having a polyethylene layer and silicone coating carried thereon and receiving an adhesive release surface. It is taught that the silicone surface and release surface may be treated with a corona discharge to control the release force required. However, no suggestion is to be found of a primer between the polyolefin and silicone surfaces, and the silicone surface is not analogous to that of the instant invention in that the polymer is not taught to be an uncured silicone elastomer. The polyethylene surface and the silicone rubber polymer surface are not films but instead are applied from a solution. Further, the object of the patent is not to join polyolefins and silicone rubber films and solid materials, but instead to provide an adhesive release control.

Another approach to modifying the characteristics of silicone rubber is to be found in Meeks et al U.S. Pat. No. 3,971,884 in which the silicone rubber is bonded to a cross linked ethyl-vinyl acetate resin for use as electrical wire insulators.

In summary, while adhesives have been utilized to bond materials to silicone rubber, it is not apparent that a composite material of cured silicone rubber bonded to polyolefin in high molecular weight, solid film or sheet form as heretofore been available.

DETAILED DESCRIPTION OF THE INVENTION

Figure 1:
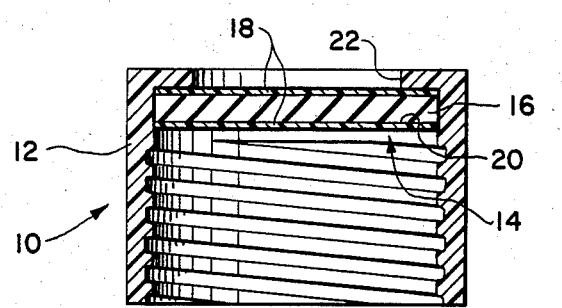
FIG. 1 is a side view in section of a closure configuration illustrating the use of an ultrasonic bonded polypropylene film to the closure body with the polypropylene film being in turn bonded to a silicone rubber insert.

According to the present invention, relatively high molecular weight, i.e., molecular weights above 61,000 and high modulus, i.e. modulus above fifty per cent elongation silicone elastomer compounds may be chemically bonded to chemically inert polyolefin films such as polypropylene and high or low density polyethylene. This is accomplished by first treating the polyolefin films with a corona discharge as is known for instance to increase bonding of low modulus silicone adhesives and thereafter further treating the polyolefin with a unique primer material. The preferred primer material is a solution of between about 0.5% and 2% by weight ethyl silicate, between about 4.5% and 12% by weight ethyl ortho silicate, between about 3% and 10% by weight tetra butyl titanate in a naphthalite 66/3 solvent with the solvent comprising 75% to 90% of the solution. Promptly after the corona discharge treatment of the polyolefin surface, the polyolefin and uncured silicone elastomer surfaces are placed together with the primer therebetween. Sufficient pressure to force the surfaces firmly together is applied and the silicone elastomer is cured in an essentially conventional fashion by applying heat a required for the particular elastomer. In conjunction with the curing of the elastomer, the elastomer is firmly bonded to the sheet, film or other shape of polyolefin, at the interface therebetween. The bond has been found to be quite secure and the materials usually fail at the elastomer rather than at the interface between the polyolefin and elastomer when separation is attempted.

Similar results have been accomplished with other difficult to bond elastomeric materials such as chlorobutyl rubber utilizing an essentially identical process. The strong, thin chemical bonding between the polyolefin film and the elastomer is accomplished in such a manner that the composite material may be considered a single article having the selected advantages of each material, i.e. the ability to heat bond to similar materials of polyolefin, as well as the inertness, and particularly the inertness to living tissues, of the silicone rubber.

The articles resulting from the instant invention as well as the method of bonding will be more readily appreciated by considering the following examples.

EXAMPLE ONE

A thin pliant tube of polypropylene is corona discharge treated and coated with a solution of 1% ethylsilicate, 6% ethyl ortho silicate, and 5% tetra butyl titanate in naphthalite 66/3 solvent. The polypropylene tube is coated with liquid silicone rubber in an uncured state to a thickness between 4 to 10 mils. Thereafter, the coated tubing is heated in an oven to a temperature of 120° C. for a period of about five minutes to produce a catheter primarily formed of economical poly propylene material having a desirable stiffness for handling and inserting in living tissue but coated with an inert tissue compatible outer surface of silicone rubber.

EXAMPLE TWO

A polypropylene cap is corona discharge treated at the interior surface thereof and treated with a primer solution similar to that described in example 1. Liquid uncured silicone elastomer is then applied to the interior of the cap and the cap is spun to permit flow of the silicone to the interior edge of the cap in a uniform layer. Thereafter, the cap and uncured liquid silicone elastomer is placed in an oven and cured at the temperature described in Example 1 until complete bonding between the silicone rubber and polyolefin is accomplished and complete curing of the silicone rubber is realized.

EXAMPLE THREE

A film of polypropylene is advanced from a roll and conducted through a corona discharge area to corona discharge activate the surface of the polypropylene. A primer solution in accord with the formulation above described is applied to the treated surface of the polypropylene and the polypropylene is joined with an extruded film of uncured silicone rubber with the primer between the two surfaces. Thereafter, the silicone rubber and polypropylene materials are passed between heated rollers to firmly join the materials together and curing of the silicone rubber is initiated. After pressing between the heated rollers, adjoined materials are conducted through an oven at a temperature at about 120° C. to complete curing of the silicone rubber and form a thin and strong chemical bond between the silicone rubber and the polypropylene film. Circular pieces may be punched from the composite material and, for instance, heat welded within an open top closure with the polyolefin portion of the circular insert bonding to the polyolefin closure and to the silicone rubber surface to provide a piercable surface which, as a result of the bonded polyolefin, will not readily core when a needle is passed through, and which will reseal the opening made by a needle to provide for integrity of the contents of the container.

DESCRIPTION OF THE DRAWINGS

Turning now to the drawings, where like components are designated by like reference numerals throughout the various figures, a closure in accord with the instant invention is illustrated in FIG. 1 and generally designated by the reference numeral 10. Closure 10 comprises a conventional open top closure body 12 of polypropylene which receives in the internal upper portion thereof a composite material insert 14. Insert 14 is formed of internal portion 16 of silicone elastomer having bonded thereto upper and lower film surfaces 18 of polypropylene. It is to be understood that insert 14 could also, for instance, utilize a lower surface of yet another material, such as polytetraflouroethylene or various polyester materials which are inert and highly impermeable to gases to provide a hermetic seal. However, for purposes of illustration of the instant invention, both upper and lower surfaces 18 may be viewed as being of polypropylene. Upper surface 18 of insert 14 is bonded, such as by ultrasonic welding, to the lower portion of closure body 12 annular portion 22.

Figure 2:
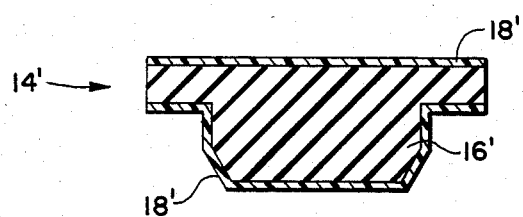
FIGS. 2 and 3 are section views of a silicone rubber-polyolefin closure similar to that of FIG. 1 particularly adapted to receive a hypodermic needle for access to the contents of the closure.
Figure 3:
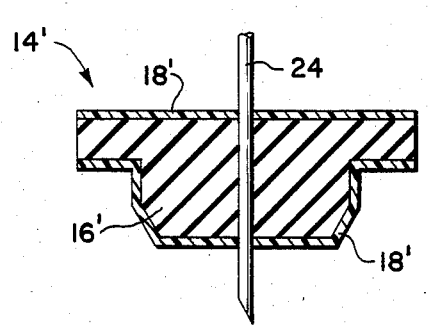
Figure 4:
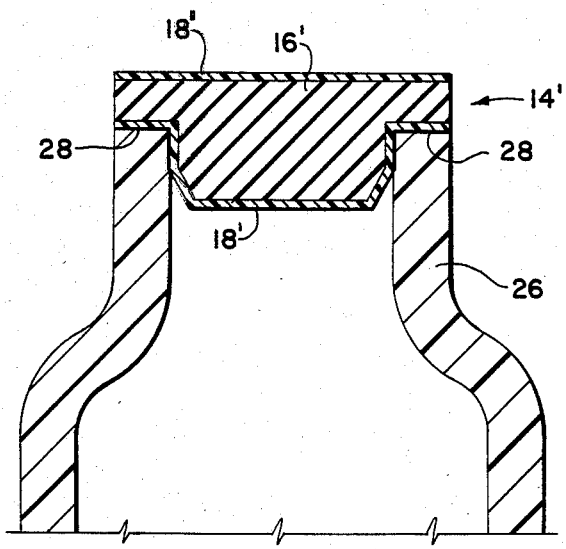
FIG. 4 is a side view partially in section of the closure of FIGS. 2 and 3 bonded to a container to form a sealed unit.

Another embodiment of the invention is illustrated in FIGS. 2 through 4 in which composite member 14', which is quite similar structurally to insert 14 of FIG. 1, is shown. With particular reference to FIG. 2, it will be seen that composite member 14' is internally formed of silicone elastomer 16' with upper and lower surfaces 18' of a polyolefin material chemically bonded thereto in the manner described elsewhere in this application. As shown in FIG. 3, composite member 14' is particularly useful as a resealing closure such that hypodermic needle 24 may be passed therethrough. The reinforcing effect of polyolefin film 18' joined to silicone elastomer 16' intends to greatly reduced the incident of "coring" by needle 24 when passing through composite member 14' while permitting resealing when needle 24 is withdrawn.

As shown in FIG. 4, composite member 14' may be conveniently utilized as a closure by bonding polyolefin lower surface 18' to a polymer container 26, preferably of polyolefin, through a convenient weld at interface 28 therebetween. Ultrasonic welding is particularly advantageous for bonding composite member 14' to container 26.

Figure 5:
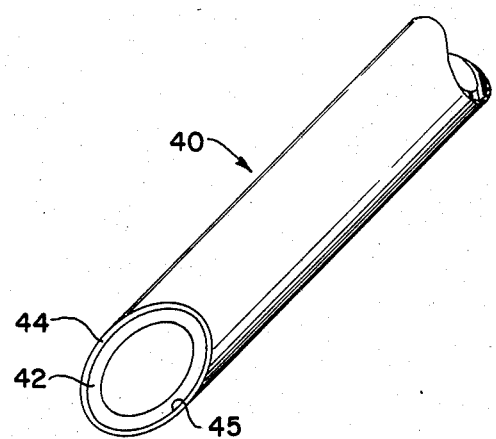
FIG. 5 is a perspective view of a catheter in accord with the instant invention.

In a related embodiment of the invention, catheter 40 is illustrated as shown in FIG. 5. Catheter 40 is comprised of an inner polyolefin surface 42, preferably polypropylene, an outer coating of elastomer 44, preferably silicone elastomer bonded in accord with the instant invention securely one to the other at interface 45 therebetween. Catheter 40 is not only more economical to produce in that the greater amount of material is of a more economical polyolefin material, but manipulation and use of catheter 40 is also enhanced as a result of the more desirable stiff structure of the inner polyolefin tube 42. However, the outer coating 44 of elastomer is inert and nonirritating to human tissue and therefore may be safely threaded through human tissues such as veins, arteries, etc.

In summary, the instant invention provides for the first time the ability to bond a polyolefin material, and particularly polypropylene, to a high modulus true silicone "rubber" composition in a secure, strong and convenient fashion. The bond is stronger than the elastomer and accordingly failure of the composite material usually occurs at other than the bond. Medical uses including closures for containers of drugs, serums, etc., particularly those adapted to be accessed by a hypodermic needle. Catheters and similar tissue engaging structures are particularly pointed out as important novel structures which employ the bonding mechanism. However, many other structures are contemplated. Accordingly, although only limited embodiments of the instant invention have been specifically illustrated and described, it is to be understood that variations of the invention will be apparent to those skilled in the art, and that the invention is limited only by the scope of the following claims.

What is claimed is:

1. A method of chemically bonding elastomeric materials to chemically inert polyolefins, the method comprising:
    exposing a chemically inert polyolefin surface to a corona discharge treatment,
    applying to the corona discharge treated surface of the polyolefin a primer solution of ethyl silicate, ethyl ortho silicate and tetra butyl titanate in an organic solvent,
    placing the treated and primed surface of polyolefin in contact with the surface of an uncured elastomeric compound of molecular weight above 61,000 with a minimum elongation modulus of fifty percent; and
    applying heat to the composite material to cure the elastomeric compound while pressing the polyolefin elastomeric compound article firmly together, whereby upon curing of the elastomeric material the polyolefin will be firmly and securely bonded thereto.

2. A method for chemically bonding elastomeric materials to polyolefins as set forth in claim 1 in which the elastomeric compound is a silicone rubber composition.

3. A method for chemically bonding elastomeric materials to polyolefins as set forth in claim 1 in which the primer solution consists essentially of between about 0.5% to 2% by weight ethyl silicate, between about 4.5% to 12% by weight ethyl ortho silicate and between about 3% to 10% by weight tetra butyl titanate in naphthalite solvent with the solvent comprising 75% to 90% by weight of the solution.

4. A method for chemically bonding elastomeric materials to polyolefins as set forth in claim 1 in which the polyolefin material is polypropylene.

5. A method for chemically bonding elastomeric materials to polyolefins as set forth in claim 1 in which the elastomer material is applied to the treated polyolefin as a liquid solution of uncured elastomeric material.

6. A method for chemically bonding elastomeric materials to polyolefins as set forth in claim 5 in which the liquid elastomer is applied to the interior of a treated and primed polyolefin closure, the closure spun to spread the liquid material, and the spread elastomeric material thereafter cured.

7. A method for chemically bonding elastomeric materials to polyolefins as set forth in claim 5 in which the liquid elastomeric material is applied to the surface of a treated and primed polyolefin tube to a thickness of between 4 mils to 10 mils and the liquid elastomeric material thereafter cured and bonded to the polyolefin tubing.

8. A method for chemically bonding elastomeric materials to polyolefins a set forth in claim 1 in which the polyolefin material and elastomeric material are both in sheet forms.

9. A method for chemically bonding elastomeric materials to polyolefins as set forth in claim 1 in which the polyolefin material chemically bonded to the elastomeric material is in turn bonded by welding to yet another polyolefin surface.

10. A composite article comprising a polyolefin material and an elastomeric material bonded together by the method set forth in claim 1.

* * * * *